United States Patent
Amari et al.

(10) Patent No.: US 12,028,200 B2
(45) Date of Patent: Jul. 2, 2024

(54) OPTICAL TRANSCEIVER AND FRAME SYNCHRONIZATION METHOD OF MONITORING CONTROL SIGNAL

(71) Applicant: SUMITOMO ELECTRIC DEVICE INNOVATIONS, INC., Kanagawa (JP)

(72) Inventors: Shogo Amari, Kanagawa (JP); Takayuki Suzuki, Kanagawa (JP)

(73) Assignee: SUMITOMO ELECTRIC DEVICE INNOVATIONS, INC., Kanagawa (JP)

( * ) Notice: Subject to any disclaimer, the term of this patent is extended or adjusted under 35 U.S.C. 154(b) by 38 days.

(21) Appl. No.: 17/814,604

(22) Filed: Jul. 25, 2022

(65) Prior Publication Data
US 2023/0031410 A1 Feb. 2, 2023

(30) Foreign Application Priority Data
Jul. 27, 2021 (JP) ................. 2021-122227

(51) Int. Cl.
*H04L 27/26* (2006.01)
*H04B 10/40* (2013.01)

(52) U.S. Cl.
CPC ......... *H04L 27/2656* (2013.01); *H04B 10/40* (2013.01)

(58) Field of Classification Search
None
See application file for complete search history.

(56) References Cited

U.S. PATENT DOCUMENTS

| | | | | |
|---|---|---|---|---|
| 2006/0269283 A1* | 11/2006 | Iwadate | ............. | H04B 10/0799 398/22 |
| 2007/0065151 A1* | 3/2007 | Dybsetter | ............. | H04B 10/40 398/135 |
| 2012/0008962 A1* | 1/2012 | Tanaka | ................... | H04B 10/40 398/135 |
| 2016/0277104 A1* | 9/2016 | Kim | ................... | H04B 10/0773 |
| 2017/0288779 A1* | 10/2017 | Tatum | .............. | H04B 10/25073 |

FOREIGN PATENT DOCUMENTS

| | | |
|---|---|---|
| JP | 2016-072848 | 5/2016 |
| JP | 2018-514982 | 6/2018 |
| JP | 2018-520561 | 7/2018 |
| WO | 2016/154004 | 9/2016 |
| WO | 2016/187445 | 11/2016 |

OTHER PUBLICATIONS

Recommendation ITU-T G.698.4 (2018)—Corrigendum 1, International Telecommunication Union, Nov. 2018.

* cited by examiner

*Primary Examiner* — Darren E Wolf
(74) *Attorney, Agent, or Firm* — IPUSA, PLLC

(57) ABSTRACT

An optical transceiver includes an optical transmitter transmit an optical signal; an optical receiver to extract a monitoring control signal from an optical signal, the monitoring control signal including first and second frames having the respective headers, and being separated in time; and a processing part to generate a bit stream from the monitoring control signal; generate a first byte stream from the bit stream; extract monitoring control data from a byte stream subsequent to the first byte stream, if the first byte stream is equal to the first header; generate a second byte stream from the bit stream if the first byte stream is different from the first header, the second byte stream having the same length as the second header; and extract the monitoring control data from a byte stream subsequent to the second byte stream if the second byte stream is equal to the second header.

8 Claims, 7 Drawing Sheets

OPTICAL TRANSCEIVER AND FRAME SYNCHRONIZATION METHOD OF MONITORING CONTROL SIGNAL

CROSS-REFERENCE TO RELATED APPLICATION

The present application is based upon and claims priority under 35 U.S.C. § 119 to Japanese Patent Application No. 2021-122227 filed on Jul. 27, 2021, the entire contents of which are incorporated herein by reference.

TECHNICAL FIELD

The present disclosure relates to a frame synchronization method and an optical transceiver using the frame synchronization method.

BACKGROUND

An optical transceiver extracts, for example, monitoring control data from a low-rate signal superimposed on a received high-rate optical signal. The extracted monitoring control data is used for monitoring control of the optical transceiver and an optical network. Also, the optical transceiver superimposes low-rate monitoring control data on a high-rate optical signal for monitoring control, and transmits the superimposed data.

For example, a frame synchronizer determines in parallel, based on timings at which input data is equal to a synchronization pattern, at the multiple matched timings, whether the input data is continuously equal to the synchronization pattern during the cycle of a frame length. Then, the frame synchronizer executes frame synchronization of the input data based on the determination result.

For example, in the HTMC (Head to Tail Message Channel) frame of G.698.4 of ITU-T (International Telecommunication Union Telecommunication Standardization Sector) recommendation, the frame length (frame size) is 6 bytes (48 bits). In the HTMC frame, the ratio of the data body (message) to the frame length is 50%, and hence, the size of the data body is three bytes (24 bits). A part in the frame in which the data body is stored is also referred to as a payload. For example, in the case of transmitting a large amount of monitoring data between optical transceivers, in order to improve the transmission efficiency of the monitoring data, it is favorable that the ratio of the payload size to the frame size is high.

For example, in SONET (synchronous optical network)/SDH (Synchronous Digital Hierarchy) established by ITU-T, for each row of a frame structure configured with multiple rows and multiple columns, a fixed frame length (number of columns) is used in accordance with the transmission rate, and the ratio of the payload part to store a payload to the frame length is greater than in the HTMC frame. Also, a header including a synchronization pattern for synchronization of the frame is provided at the head of the frame structure, and by detecting the synchronization pattern in the header, the frame synchronization is executed.

Meanwhile, as the size of the payload part becomes greater, a likelihood that the payload part includes the same pattern as the synchronization pattern of the header becomes higher, and thereby, a likelihood of erroneous detection of the header becomes higher. Therefore, by scrambling the payload data so as to ensure that the payload part does not include the synchronization pattern, erroneous detection of the header can be avoided.

SUMMARY

According to an aspect of the present embodiment, an optical transceiver includes an optical transmitter part configured to transmit an optical transmission signal; an optical receiver part configured to receive an optical reception signal having a monitoring control signal superimposed, and extract the monitoring control signal from the optical reception signal, the monitoring control signal including a first frame and a second frame, the first frame having a first header at a head of the first frame, the second frame having a second header at a head of the second frame, the first frame and the second frame being separated from each other in time; and a processing part including a memory and a processor configured to generate a bit stream from the monitoring control signal; generate a first byte stream from the bit stream, the first byte stream having a length equal to a length of the first header; extract monitoring control data from a byte stream subsequent to the first byte stream, based on a frame structure of the first frame, in case of the first byte stream having a value equal to a first unique value of the first header; generate a second byte stream from the bit stream in case of the first byte stream having a value different from the first unique value of the first header, the second byte stream having a length equal to a length of the second header; and extract the monitoring control data from a byte stream subsequent to the second byte stream based on a frame structure of the second frame, in case of the second byte stream having a value equal to a second unique value of the second header.

DETAILED DESCRIPTION

Figure 1:
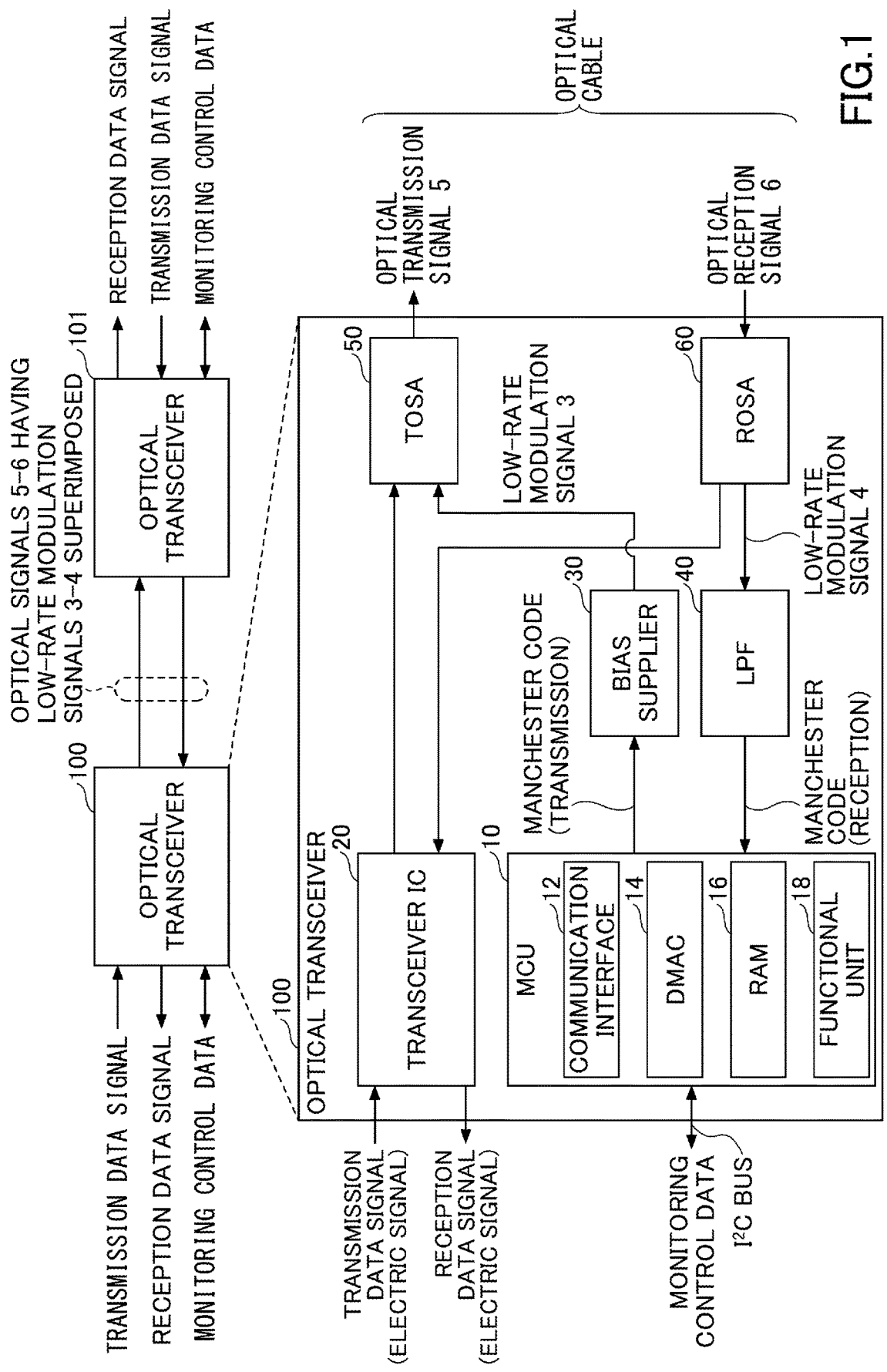
FIG. 1 is a block diagram illustrating an example of a configuration of an optical transceiver according to one embodiment.

Specific examples of a frame synchronization method in the present disclosure will be described below with reference to the drawings. Note that the present embodiment is not limited to the following description. In the following description, for a signal line through which information such as a signal is transmitted, the same reference numeral as the signal name is used. In particular, unless otherwise noted, an arrowed line in the block diagram indicates a transmission path of a signal line, an optical cable, or information. Also, a signal line illustrated as a single line in the figure may include multiple lines.

One Embodiment

[Overall Configuration of the Optical Transceiver]

FIG. 1 is a block diagram illustrating an example of a configuration of an optical transceiver according to one embodiment. For example, in FIG. 1, two optical transceivers 100 and 101 connected to each other through a two-core optical cable (optical fiber) transmit and receive optical signals having low-rate modulation signals superimposed. The optical transceivers 100 and 101 can execute transmission of monitoring control data and reception of monitoring control data through low-rate modulation signals. The monitoring control data is stored in the payload of a frame that will be described later, to be transmitted and received. When transmitting monitoring control data, the monitoring control data is stored in the payload of the frame; a low-rate modulation signal is generated from the frame and superimposed on an optical signal; and the low-rate modulation signal is transmitted. When receiving the monitoring control data, the low-rate modulation signal superimposed on the optical signal is separated from the optical signal; the frame is demodulated from the low-rate modulation signal; and the monitoring control data is extracted from the payload of the frame. The frame includes unique data for detecting the beginning of the frame (synchronization pattern), and by detecting the synchronization pattern, the frame is received. Detecting a synchronization pattern to receive a frame is referred to as frame synchronization. The optical transceivers 100 and 101 execute frame synchronization upon reception of monitoring control data. The optical transceiver 101 may have the same configuration as the optical transceiver 100. In the following, the optical transceiver 100 on the left side in FIG. 1 will be described.

The optical transceiver 100 includes, for example, an MCU (Micro Control Unit) 10, a transceiver IC (Integrated Circuit) 20, a bias supplier 30, a low-pass filter (LPF) 40, a TOSA (Transmitter Optical Sub-Assembly) 50, and a ROSA (Receiver Optical Sub-Assembly) 60. For example, the optical transceiver 100 is detachably attached to an optical transmission device (not illustrated), with which digital signals are transmitted and received. The bias supplier 30 and the TOSA 50 comprise an example of an optical transmitter part. The ROSA 60 and the low-pass filter 40 comprise an example of an optical receiver part.

When an optical signal is transmitted through an optical fiber, an end at which the optical signal is transmitted will be referred to as the transmitting end, and an end at which the optical signal is received will be referred to as the receiving end. The optical transceiver 100 at the transmitting end converts a transmission data signal (digital electric signal) received from an optical transmission device at the transmitting end to an optical signal, and transmits the converted optical signal to the optical transceiver 101 attached to an optical transmission device at the receiving end through the optical cable. The optical transceiver 101 at the receiving end converts the optical signal received from the optical transceiver 100 at the transmitting end through the optical cable, to a reception data signal (digital electric signal), and outputs the converted reception data signal to the optical transmission device at the receiving end. Note that here, the transmitting end and the receiving end are distinguished for the sake of convenience of description; as optical signals are transmitted and received bidirectionally, the optical transceiver 100 regarded as at the transmitting end with respect to transmission is regarded as at the receiving end with respect to reception. In the following description, an optical transmission device with which the optical transceiver 100 at the transmitting end transmits and receives electric signals is the optical transmission device at the transmitting end to which the optical transceiver 100 is connected, and an optical transmission device with which the optical transceiver 101 at the receiving end transmits and receives electric signals is the optical transmission device at the receiving end to which the optical transceiver 101 is connected.

Also, the optical transceiver 100 superimposes a low-rate modulation signal including monitoring control data on an optical signal, to transmit the optical signal to the other optical transceiver 101 connected through the optical cable. For example, the optical transceiver 100 transmits Manchester-coded monitoring control data, and receives Manchester-coded monitoring control data from the other optical transceiver 101. The low-rate modulation signal including the monitoring control data is an example of a monitoring control signal.

The monitoring control data includes, for example, a monitor value measured on the optical transceiver 100 (at least one of the temperatures of internal mounted components, power supply voltage, laser bias current, optical transmission power, optical reception power, and the like), although not limited particularly as such. Also, the monitoring control data includes unique information with which the optical transceiver 100 can be identified, a command to change the wavelength (or the frequency) of an optical signal, a command to change the optical output power, and the like. For example, the unique information with which the optical transceiver 100 can be identified includes the serial number (manufacturing number) and the model number of the optical transceiver 100.

The MCU 10 includes, for example, various types of communication interfaces 12 such as an $I^2C$ (Inter-Integrated Circuit) interface (not illustrated), peripheral functional components such as a DMAC (Direct Memory Access Controller) 14, and a RAM (Random Access Memory) 16. Also, the MCU 10 also includes a ROM (Read-Only Memory) (not illustrated) in which various types of programs executed by the MCU 10 are stored. The ROM may be, for example, a flash memory. The MCU 10 has functions of controlling operations of the optical transceiver 100, and processing monitoring control data. The MCU 10 may be, for example, a microcomputer, or may be a logic device such as a CPLD (Complex Programmable Logic Device) or FPGA (Field Programmable Gate Array). In the MCU 10, a functional unit 18 to process monitoring control data is an example of a processing unit.

The MCU 10 receives monitoring control data from the optical transmission device, for example, through an $I^2C$ bus, and generates a frame that includes the received monitoring control data. The monitoring control data is stored, for example, in the payload part of the frame. The MCU 10 converts (encodes) a bit stream corresponding to the generated frame into Manchester codes, and outputs the converted Manchester-coded frame to the bias supplier 30. For example, in the case of the frame size being six bytes, the length of the bit stream is 48 bits. In other words, the bit stream is data in which 48 binary "0" or "1" are arranged consecutively. The bias supplier 30 generates a bias current in which a low-rate modulation signal is superimposed according to the data of the frame. The bias supplier 30 will be described later.

Also, the MCU 10 receives a low-rate modulation signal superimposed on an optical signal that is transmitted from the other optical transceiver 101 through the optical cable, through the ROSA 60 and the low-pass filter 40. The low-pass filter 40 extracts the low-rate modulation signal from the optical signal received from the other optical transceiver 100, and outputs the extracted signal to the MCU 10 as a Manchester-coded low-rate modulation signal 4. The MCU 10 converts (decodes) the received Manchester-coded low-rate modulation signal 4 to a bit stream. The converted bit stream is processed by the MCU 10, a frame is detected from the bit stream, and the monitoring control data is generated.

The MCU 10 extracts the frame from the converted bit stream by frame synchronization, and extracts the monitoring control data from the extracted frame. The MCU 10 outputs the extracted monitoring control data to the optical transmission device, for example, through the I$^2$C bus. For example, the MCU 10 has an encoder and a decoder of Manchester codes. Note that the code used in a low-rate modulation signal transmitted and received between the optical transceiver 100 and the optical transceiver 101 is not limited to the Manchester code, but may be another code.

Based on the transmission data signal received from the optical transmission device, for example, the transceiver IC 20 generates a digital signal of an NRZ (Non Return to Zero) signal, and outputs the generated digital signal to the TOSA 50. For example, the transceiver IC 20 may be a CDR (Clock Data Recovery)-IC, and for example, the CDR-IC may output the transmission data signal to the TOSA 50 as the digital signal with waveform shaping. Alternatively, the transceiver IC may be a digital signal processing IC, and for example, the digital signal processing IC may output the transmission data signal to the TOSA 50 as the digital signal with digital signal processing.

Also, the transceiver IC 20 receives the digital signal from the ROSA 60, such as an NRZ signal or the like converted from an optical signal or the like that is received from the other optical transceiver 101 connected through the optical cable. The transceiver IC 20 converts the received digital signal to a reception data signal (digital signal), and outputs the converted reception data signal to the optical transmission device. For example, the CDR-IC may apply waveform shaping to the received digital signal, to output the shaped signal as a reception data signal. Alternatively, the transceiver IC may be a digital signal processing IC, and for example, the digital signal processing IC may output a received digital signal as a reception data signal applied with digital signal processing. For example, the transmission data signal input into the optical transceiver 100 from the optical transmission device at the transmitting end is output from the optical transceiver 101 to the optical transmission device at the receiving end as the reception data signal, through optical communication between the optical transceiver 100 and the optical transceiver 101. Also, conversely, the transmission data signal input into the optical transceiver 101 from the optical transmission device at the receiving end is output from the optical transceiver 100 to the optical transmission device at the transmitting end as the reception data signal, through optical communication between the optical transceiver 100 and the optical transceiver 101. In this way, data is transmitted and received bidirectionally in an optical communication system that includes the optical transmission device at the transmitting end and the optical transmission device at the receiving end.

For example, depending on a Manchester-coded frame, the bias supplier 30 applies amplitude modulation to a bias current to drive a laser diode (not illustrated) that is installed in the TOSA 50, to supply the amplitude-modulated bias current to the TOSA 50. For example, when the Manchester code is "0", the bias current is decreased, or when the Manchester code is "1", the bias current is increased. For example, the ratio (amplitude modulation factor) of the magnitude of the increase or decrease of the bias current based on the Manchester code, to the magnitude of the bias current when the amplitude modulation is not applied, is set around several percent. A component obtained by the amplitude modulation of the bias current corresponds to a low-rate modulation signal 3. In other words, the TOSA 50 converts an electric signal to an optical signal by using a bias current amplitude-modulated by the bias supplier 30, to superimpose the low-rate modulation signal 3 including the Manchester-coded monitoring control data on the optical signal. The signal rate of the low-rate modulation signal 3 is, for example, but not limited to, 50 Kbit/s. Note that the rate of a high-rate optical signal is, for example, 10 Gbit/s or higher.

The laser diode of the TOSA 50 converts an electric signal such as an NRZ signal received from the transceiver IC 20 to an optical signal. For example, when the electric signal is an NRZ signal, when the NRZ signal is "0", the signal intensity (optical power) of the optical signal output by the laser diode is decreased, or when the NRZ signal is "1", the signal intensity (optical power) of the optical signal output by the laser diode is increased. At this time, by using the amplitude-modulated bias current based on the Manchester code described above as the bias current of the laser diode, the low-rate modulation signal 3 is superimposed on the high-rate optical signal. The magnitude of the amplitude of a low-rate modulation signal is as high as several percent of the magnitude of the amplitude of a high-rate optical signal. Then, the laser diode outputs an optical signal 5 having the low-rate modulation signal 3 superimposed as the optical transmission signal through the optical cable to the other optical transceiver 100. Note that the TOSA 50 may include a laser diode that outputs continuous light (CW light), and an optical modulator that takes as input the continuous light, to cause the laser diode to generate the continuous light amplitude-modulated with a low-rate modulation signal 3, and by driving the optical modulator with the electric signal, to generate the optical signal from the continuous light.

The ROSA 60 receives an optical signal 6 having a low-rate modulation signal 4 superimposed from the other optical transceiver 101 through the optical cable, as an optical reception signal. The ROSA 60 converts the optical reception signal to an electric current signal, amplifies the converted electric current signal, and converts the amplified signal to a voltage signal (digital signal). For example, the ROSA 60 includes a light receiving element and a transimpedance amplifier; the light receiving element converts an optical signal to an electric current signal, and the transimpedance amplifier amplifies the electric current signal and converts the amplified signal to the voltage signal. The light receiving element is, for example, a photodiode. Then, the ROSA 60 outputs the converted voltage signal to the transceiver IC 20 and to the low-pass filter 40.

The low-pass filter 40 extracts the low-rate modulation signal 4 superimposed on the optical reception signal by removing high-frequency components of the voltage signal received from the ROSA 60. The extracted low-rate modulation signal 4 is a signal whose data (bit stream) of the frame including the monitoring control data is encoded in Manchester codes. The low-pass filter 40 outputs the extracted low-rate modulation signal 4 to the MCU 10. The functional unit 18 of the MCU 10 decodes the Manchester-coded low-rate modulation signal 4, to generate a bit stream. Note that the MCU 10 may include a digital filter to extract the low-rate modulation signal 4 by the digital filter instead of the low-pass filter 40.

Note that the low-rate modulation signals 3 and 4 as examples of a monitoring control signal include a first frame FRM1 and a second frame FRM2 separated from each other in time, as will be described with FIG. 2. In other words, the first frame FRM1 and the second frame FRM2 are transmitted from the optical transceiver 100 at the transmitting end, without overlapping with each other in time, and are received by the optical transceiver 101 at the receiving end without overlapping with each other in time. For example, the low-rate modulation signals 3 and 4 are transmitted, including a bit stream corresponding to one or more first frames FRM1, followed by a bit stream corresponding to one or more second frames FRM2. Alternatively, the low-rate modulation signals 3 and 4 are transmitted, including a bit stream corresponding to one or more second frames FRM2, followed a bit stream corresponding to one or more first frames FRM1.

<Frame Format of Frame Including Monitoring Control Data>

Figure 2:
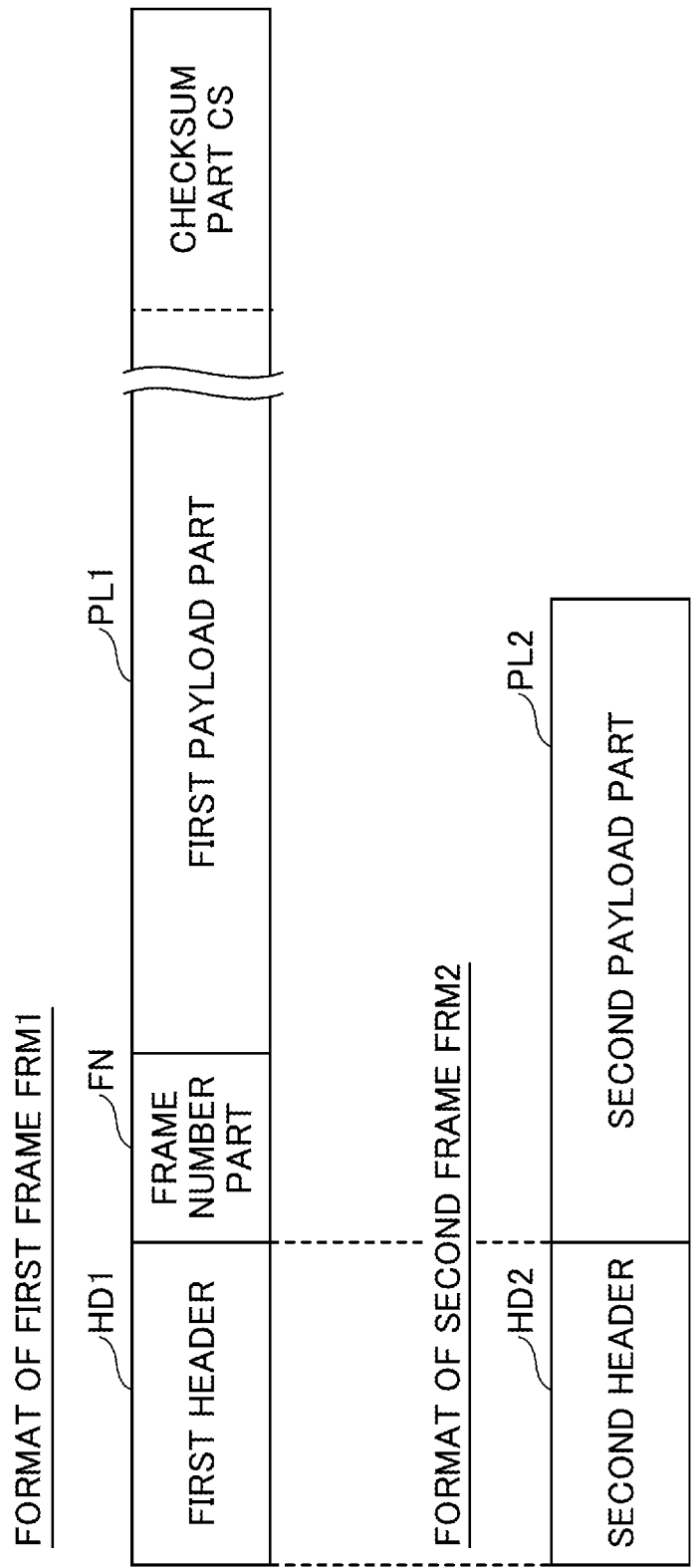
FIG. 2 is an explanatory diagram illustrating an example of a format of a frame including monitoring control data transmitted between optical transceivers in FIG. 1.

FIG. 2 is an explanatory diagram illustrating an example of a frame format of a frame (frame structure) including monitoring control data transmitted between the optical transceivers in FIG. 1. Frames for transmission of monitoring control data are, for example, the first frame FRM1 and the second frame FRM2.

For example, the MCU 10 may use the first frame FRM1 in the case where the data size of monitoring control data is greater than a predetermined amount, or may use the second frame FRM2 in the case where the data size of the monitoring control data is smaller than a predetermined amount. Accordingly, the MCU 10 can minimize the size of the frame including monitoring control data to be superimposed on an optical transmission signal. Note that instead of difference in the data size of the monitoring control data, the MCU 10 may use the first frame FRM1 and the second frame FRM2 differently depending on the configuration and the use of the monitoring control data.

For example, the first frame FRM1 includes a first header HD1, a frame number part FN, and a first payload part PL1. Note that in the following description, the first header HD1 may also be referred to as the header; the frame number part FN may also be referred to as the frame number; and the first payload part PL1 may also be referred to as the payload. The first payload part PL1 is an example of a first information storage part. Although not limited in particular, for example, the length of the first header HD1 is two bytes; the length of the frame number part FN is one byte; the length of the first payload part PL1 is 253 bytes; and the frame length (frame size) of the first frame FRM1 is 256 bytes. A frame having such a frame format (frame structure) will be referred to as a long frame. Note that the first frame FRM1 may further include a checksum part after the first payload part PL1. For example, the first frame FRM1 may include a first payload part PL1 having a length of 251 bytes and a checksum part having a length of 2 bytes, instead of the first payload part PL1 having a length of 253 bytes.

In the first header HD1, a unique value (fixed data) for identifying the head of the first frame FRM1 is set. The value of the first header HD1 is settled between the optical transceiver 100 and the optical transceiver 101 that transmit and receive monitoring control data with each other. More specifically, a predetermined value of the first header HD1 is stored in the memory (e.g., the ROM) of each of the optical transceiver 100 and the optical transceiver 101, to be referenced upon frame synchronization. For example, the first header HD1 may be set with F628h, by using values F6h ("h" indicates that the preceding numerical value is hexadecimal) and 28h, which are used in the section overhead (SOH) of a SONET/SDH frame. In this case, the bit stream of the first header HD1 is 1111011000101000b ("b" indicates that the preceding numerical value is binary). Note that the value to be set in the first header HD1 is not limited to F628h as long as the value is settled between the optical transceiver 100 and the optical transceiver 101 that transmit and receive monitoring control data with each other. The fixed data arranged in the first header HD1 is also referred to as the synchronization pattern. The optical transceivers 100 and 101 start frame synchronization upon detecting the unique synchronization pattern of the frame.

In the frame number part FN, a frame number updated each time a first frame FRM1 is transmitted is stored. For example, the frame number is updated "1" by "1" (e.g., referred to as "incremented" in the case of being increased "1" by "1") each time the optical transceiver 100 transmits a first frame FRM1. Note that the frame number is not limited to values that are updated sequentially as long as the value is updated according to a rule that is settled between the optical transceivers 100. For example, the rule may be settled so as to increase the value by "2" each time transmission is executed.

In the first payload part PL1, monitoring control data is stored as a message that indicate at least one of monitor values of the temperatures of internal mounted components, power supply voltage, laser bias current, optical transmission power, optical reception power, and the like measured in the optical transceiver 100. Note that the first payload part PL1 may include a storage part of the message, and a storage part of the checksum of the frame number and the message. In this case, for example, the message may be 251 bytes and the length of the checksum may be two bytes. Note that the checksum arranged in the first payload part PL1 may be the checksum of the message. Note that in the frame structure of the first frame FRM1 illustrated in FIG. 2, a checksum part CS may be provided separately from the first payload part PL1. For example, the frame structure of the first frame FRM1 may have, instead of the first payload part PL1 having a length of 253 bytes, a first payload part PL1 having a length of 251 bytes and a checksum part CS having a length of two bytes. The checksum part CS stores the value of the checksum described above.

In this way, in the first frame FRM1, the frame number part FN that is updated each time a first frame FRM1 is transmitted, is arranged in addition to the first header HD1. As will be described later, frame synchronization of the first frame FRM1 requires the value arranged in the frame number part FN to be equal to a particular value. Therefore, compared to the case of detecting a first frame FRM1 based on only equivalence of the value of the first header HD1, the accuracy of the detection of the first frame FRM1 can be improved. In other words, the likelihood of erroneous detection of the first frame FRM1 can be reduced, and monitoring control data can be transmitted and received more efficiently. Also, the probability that a bit stream corresponding to a combination of the header and the frame number is included in a bit stream of monitoring control data in the first payload part PL1, is lower than the probability that only the bit stream of the header is included in the bit stream of the monitoring control data. Therefore, in the case where a bit stream of the monitoring control data stored in payload part PL1 includes the same bit stream as the bit stream for frame detection, the likelihood of erroneous detection of the bit stream as the header and the frame number can be reduced. As a result, monitoring control data superimposed on an optical signal without scrambling can be received with a reduced probability of erroneous detection.

For example, the second frame FRM2 includes a second header HD2 and a second payload part PL2. The second payload part PL2 is an example of a second information storage part. Although not limited in particular, for example, the length of the second header HD2 is two bytes being the same as the length of the first header HD1; the length of the second payload part PL2 is four bytes being shorter than the length of the first payload part PL1; and the frame length of the second frame FRM2 is 6 bytes. Note that the second frame FRM2 may be an HTMC frame of G.698.4 of ITU-T recommendation. A command to identify the type of data to be arranged in the second payload part PL2 may be set in the second header HD2. In other words, multiple values different from each other may be set in the second header HD2. Also, the second header HD2 may include a storage part of the header and a storage part of the checksum of the header. In this case, for example, the header may be 11 bits and the checksum may be five bits. Note that although the header is used for identifying the head of a frame, the header is used for distinguishing different frames from each other. Therefore, the value set in the first header HD1 differs from the value set in the second header HD2.

In the second payload part PL2, for example, unique information for identifying the optical transceiver 100 may be set. Also, in the second payload part PL2, monitoring control data indicating a command to change the peak wavelength (or frequency) of an optical signal; a command to change the optical output power; or the like for the optical transceiver 101 may be set. The second payload part PL2 may include a storage part of the message, and a storage part of the checksum of the message. In this case, for example, the length of the message may be three bytes and the length of the checksum may be one byte.

In this embodiment, depending on the type or data volume of the monitoring control data transmitted to the optical transceiver 101, the MCU 10 can select and use either the first frame FRM1 or the second frame FRM2. For example, the MCU 10 may use the first frame FRM1 in the case where the data size of monitoring control data is greater than a predetermined value, or may use the second frame FRM2 in the case where the data size of the monitoring control data is smaller than a predetermined value. Accordingly, the MCU 10 can adjust the size of a frame to be transmitted by a low-rate modulation signal, to improve the transmission efficiency of monitoring control data. Alternatively, the MCU 10 may use the first frame FRM1 and the second frame FRM2 differently depending on the configuration and the use of the monitoring control data. Accordingly, by transmitting the first frame FRM1 and the second frame FRM2 separated from each other in time, the optical transceiver 100 can execute advanced monitoring control with higher functionality, in which monitoring control schemes different from each other are combined.

<Storage Areas Allocated in RAM>

Figure 3:
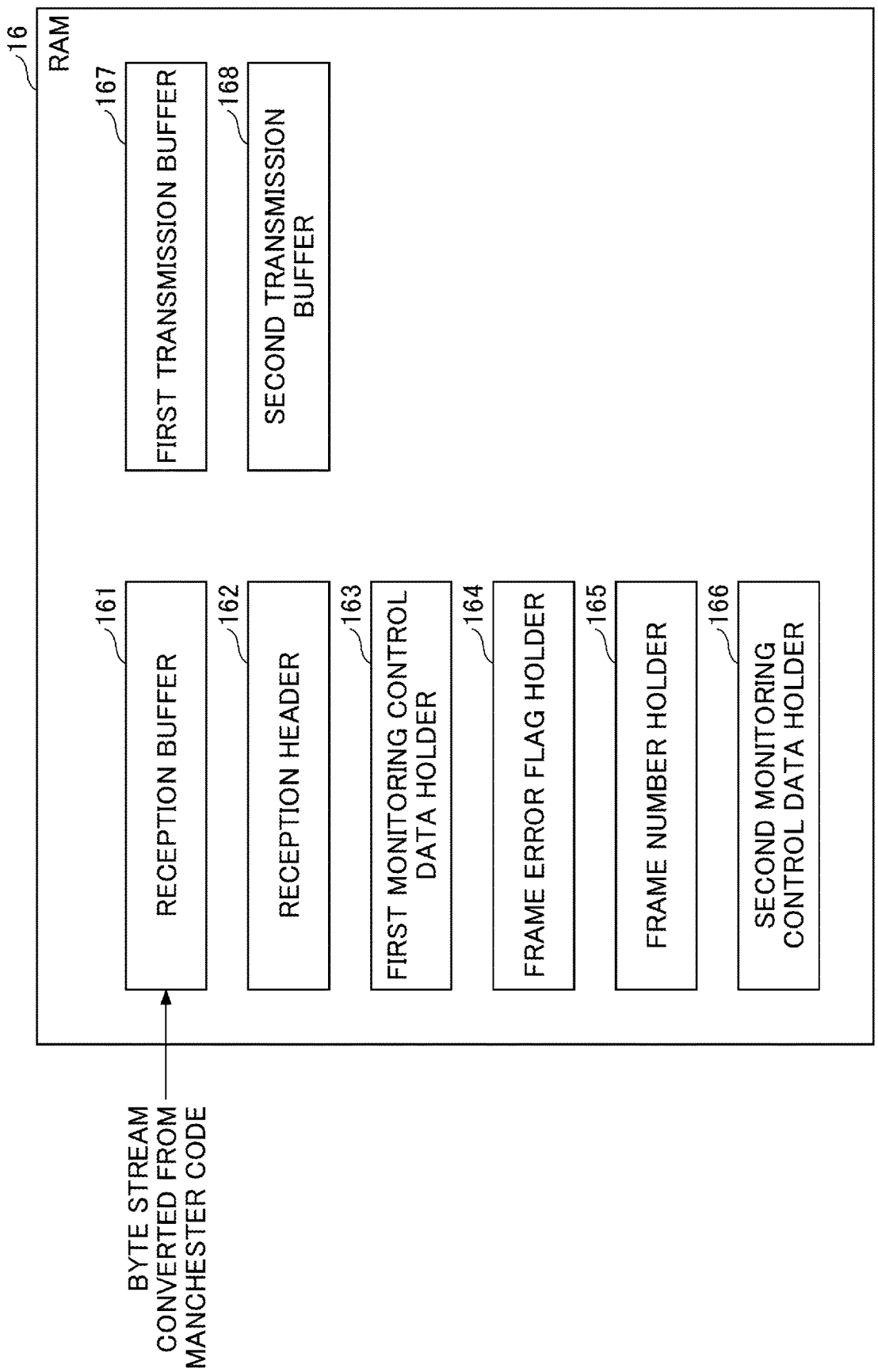
FIG. 3 is an explanatory diagram illustrating an example of storage areas allocated in a RAM in FIG. 1.

FIG. 3 is an explanatory diagram illustrating an example of storage areas allocated in the RAM 16 in FIG. 1. In the RAM 16, as storage areas for a reception process, a reception buffer 161, a reception header 162, a first monitoring control data holder 163, a frame error flag holder 164, a frame number holder 165, and a second monitoring control data holder 166 are allocated. Also, in the RAM 16, as storage areas for a transmission process, a first transmission buffer 167 and a second transmission buffer 168 are allocated. Note that at least one of the various types of storage areas illustrated in FIG. 3 may be allocated in an external memory such as a DRAM (Dynamic Random Access Memory) that is installed in the optical transceiver 100, and can be accessed by the MCU 10.

In the reception buffer 161, for example, a bit stream converted (decoded) from Manchester codes received through the low-pass filter 40, is stored sequentially as a byte stream. For example, the first bit of the bit stream is stored as the MSB (Most Significant Bit), subsequently received bits are stored in order of high to low bits, and the eighth bit from the first bit is stored as the LSB (Least Significant Bit). This conversion from eight bits to one byte may be executed in a register of the MCU 10, and the generated one-byte data may be transferred from the register to the reception buffer 161. In this way, the bit stream is converted to one-byte data items in units of eight bits, and the generated one-byte data items are sequentially stored in the reception buffer 161 starting from the head. The reception header 162 includes, for example, a two-byte storage area having the same length as the length of the first header HD1 and the length of the second header HD2, to store two bytes among the byte stream held in the reception buffer 161, that have not been obtained yet in the reception header 162, and are earlier in the order of reception. In other words, the MCU 10 obtains a byte stream (two bytes) having the same length as the length of the first header HD1 and the second header HD2 from the byte stream held in the reception buffer 161. Note that when the length of the first header HD1 is different from the length of the second header HD2, the reception header 162 includes a storage area having the same length as the longer header among the headers of the first header HD1 and the second header HD2.

In the first monitoring control data holder 163, monitoring control data included in the first payload part PL1 of the first frame FRM1 is held. The monitoring control data stored in the first monitoring control data holder 163 in the RAM 16 is transmitted by the MCU 10 to the optical transmission device through the I²C bus, in response to a request from the optical transmission device. The frame error flag holder 164 holds information indicating whether or not a receiving operation of monitoring control data of the first frame FRM1 has succeeded. For example, the frame error flag holder 164 stores a value of the frame error flag. For example, the value of the frame error flag is set to "0" when reception of the monitoring control data has succeeded, or set to "1" when reception of the monitoring control data has failed. In the frame number holder 165, update data is held as the frame number to be included in the frame number part FN of the frame structure of the first frame FRM1. The update data will be described later. In the second monitoring control data holder 166, monitoring control data included in the second payload part PL2 of the second frame FRM2 is held. The monitoring control data stored in the second monitoring control data holder 166 in the RAM 16 is transmitted by the MCU 10 to the optical transmission device through the I²C bus, in response to a request from the optical transmission device.

In the first transmission buffer 167, data of the first frame FRM1 to be transmitted is held. For example, the size of the first transmission buffer 167 is set to be greater than or equal to the frame size of the first frame FRM1. In the second transmission buffer 168, data of the second frame FRM2 to be transmitted is held. For example, the size of the second transmission buffer 168 is set to be greater than or equal to the frame size of the second frame FRM2.

<Transmitting Operations of Frames Including Monitoring Control Data>

Figure 4:
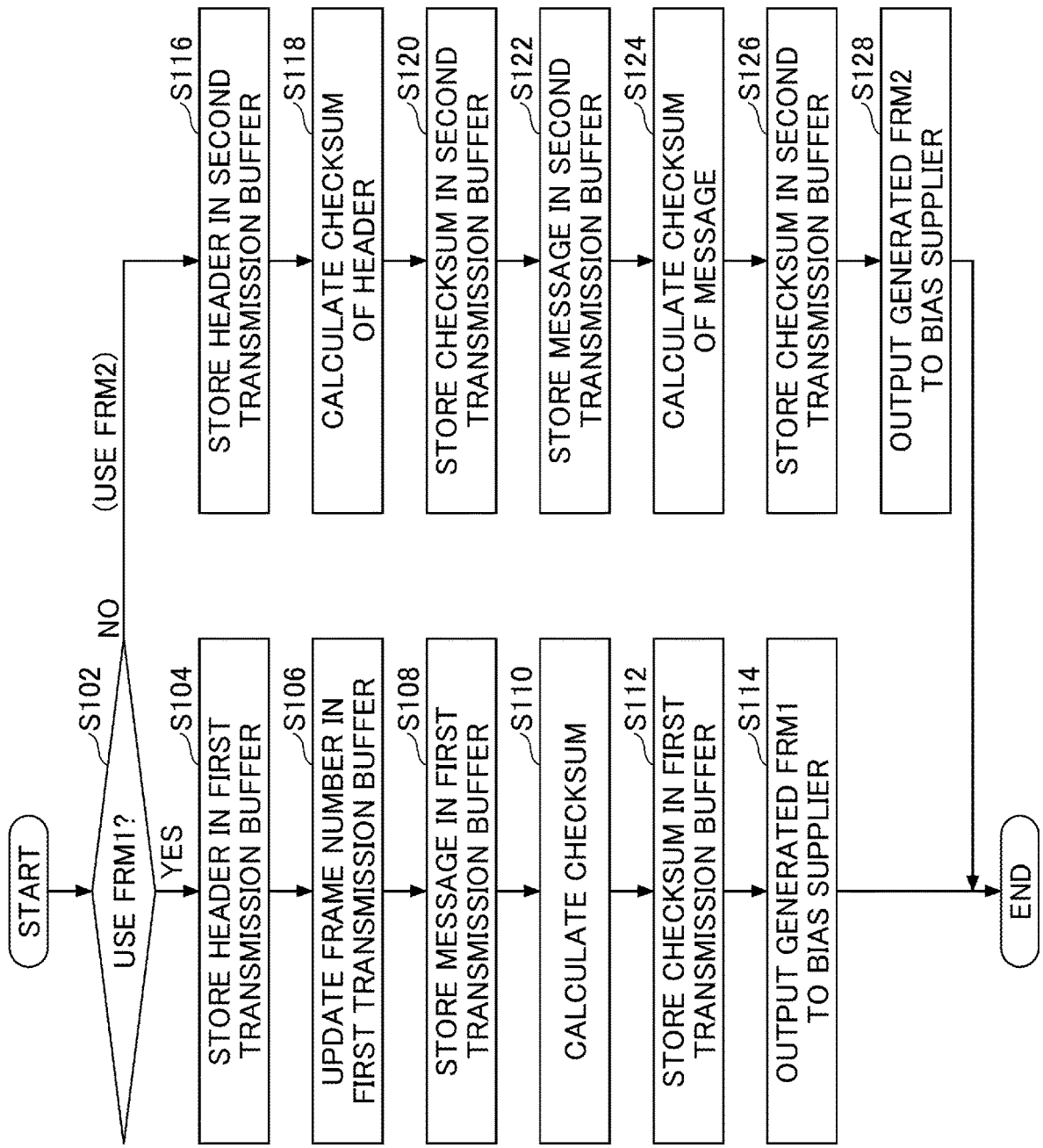
FIG. 4 is a flow chart illustrating an example of transmitting operations of a first frame or a second frame executed by the optical transceiver in FIG. 1.

FIG. 4 is a flow chart illustrating an example of transmitting operations of the first frame FRM1 and the second frame FRM2 executed by the optical transceiver 100 in FIG. 1. For example, the operations illustrated in FIG. 4 are implemented by the MCU 10 executing a control program (transmission program) stored in the built-in ROM. In other words, FIG. 4 illustrates an example of a control method of the optical transceiver 100 and an example of a control program of the optical transceiver 100. Note that the operations illustrated in FIG. 4 may be implemented by a logic circuit programmed in the programmable logic unit provided in the MCU 10. Alternatively, the operations illustrated in FIG. 4 may be executed by a logic device such as a CPLD or FPGA instead of the MCU.

The operations illustrated in FIG. 4 start in the case where the optical transceiver 100 transmits monitoring control data to the optical transceiver 101. More specifically, the operations illustrated in FIG. 4 start, for example, in the case where the power supply of the optical transceiver 100 is turned on to start transmitting operations of an optical signal. Alternatively, the optical transceiver 100 is reset by the optical transmission device, and then, the transmitting operations of an optical signal start. Note that in the operations illustrated in FIG. 4, checksums are arranged in the second header HD2 of the second frame FRM2 and the second payload part PL2, and the first payload part PL1 of the first frame FRM1, respectively. As described above, the first frame FRM1 may be further provided with a checksum part CS, to store the checksum in the checksum part CS. In the case where the checksums are not arranged, processing at Steps S110, S112, S118, S120, S124, and S126 described below is omitted. Note that by arranging the checksums, whether a received frame has an error can be detected, and the reliability of transmission and reception of monitoring control data can be improved.

First, at Step S102, depending on the type of monitoring control data to be transmitted, the MCU 10 determines whether to use the first frame FRM1 or the second frame FRM2, upon transmitting the monitoring control data. Whether to use the first frame FRM1 or the second frame FRM2 may be determined according to a command from the optical transmission device. If using the first frame FRM1, the process transitions to Step S104, or if using the second frame FRM2, the process transitions to Step S116. Note that in the case of starting transmission of the first frame FRM1, the MCU 10 initializes the frame number, for example, to "0", to be stored in the first frame FRM1 for transmitting the monitoring control data.

At Step S104, the MCU 10 stores a value (e.g., F628h) of the header in an area of the first header HD1 allocated in the first transmission buffer 167 in the RAM 16. At this time, the first header HD1 is arranged at the head of the first frame FRM1. More specifically, the MCU 10 stores the value (e.g., the F628h) of the header in the area of the first header HD1 allocated in the first transmission buffer 167 in the RAM 16. The value of the header corresponds to the synchronization pattern in frame detection. Note that as described above, the first header HD1 is data having a fixed value, and hence, may be arranged in advance at the head of the first transmission buffer 167.

Next, at Step S106, the MCU 10 increments by "1" the value of the frame number held in the area of the frame number part FN allocated in the first transmission buffer 167. In the RAM 16, the value of the frame number is treated as hexadecimal. Note that for example, when the length of the frame number is one byte, before the first transmission of the first frame FRM1, the MCU 10 initializes the value of the frame number, for example, to "00h". In this way, in the first transmission buffer 167, the value of the frame number part FN of the first frame FRM1 is set or updated to a predetermined value.

Next, at Step S108, the MCU 10 stores the monitoring control data in an area of the first payload part PL1 allocated in the first transmission buffer unit 167. In the following description, the monitoring control data stored in the first payload part PL1 is also referred to as a message. For example, monitoring control data of 251 bytes is an example of a message. Next, at Step S110, the MCU 10 calculates the checksum. The checksum is calculated, for example, by a predetermined method from the value of the frame number part FN and the value of the message. Next, at Step S112, the MCU 10 stores the checksum calculated at Step S110 in the area of the check sum of the first payload part PL1 allocated in the first transmission buffer unit 167. Alternatively, if the frame structure of the first frame FRM1 includes the checksum part CS, the checksum calculated at Step S110 may be stored in the area of the checksum part CS allocated in the first transmission buffer 167.

Next, at Step S114, the MCU 10 generates a bit stream from the data (byte stream) of the first frame FRM1 generated in the first transmission buffer 167, encodes the bit stream into Manchester codes, and outputs the encoded bit stream to the bias supplier 30. For example, for one byte included in the byte stream, the bit stream is generated, by arranging bits one by one in order from the MSB to the LSB wherein the MSB comes first. At this time, the bit stream is generated that the LSB of a certain byte is followed by the MSB of the next byte. The bias supplier 30 supplies an amplitude-modulated bias current to the TOSA 50 depending on the Manchester-coded bit stream. By using the amplitude-modulated bias current, the TOSA 50 converts a transmission signal such as an NRZ signal received from the transceiver IC 20 to an optical transmission signal. Accordingly, a low-rate modulation signal including the monitoring control data converted to the Manchester codes is superimposed on the optical transmission signal. The TOSA 50 outputs the optical transmission signal having the low-rate-modulation signal superimposed to the optical cable connected to the optical transceiver 101 at the receiving end. Thus, the transmitting operations of the first frame FRM1 for the first time end. Note that in the case of transmitting multiple first frames FRM1 consecutively, Step S104 to S114 are executed repeatedly. Meanwhile, the optical cable connecting the optical transceiver 100 with the optical transceiver 101 is, for example, a part of a dense wavelength division multiplexing (DWDM) transmission system, and in the middle of the optical cable, a DWDM filter, an OADM (optical add-drop multiplexer), an optical amplifier, and the like may be included.

Note that in the case where generation timings of the first frame FRM1 and the second frame FRM2 do not overlap with each other in time, the first frame FRM1 and the second frame FRM2 may be generated by using a common frame buffer (transmission buffer) allocated in the RAM 16. In this case, the size of the common frame buffer is set, for example, such that data (frame size) of the first frame FRM1 that is longer than the length (frame size) of the second frame FRM2 can be stored. Accordingly, the area of the RAM 16 required for transmission of the first frame FRM1 and the second frame FRM2 can be reduced.

Meanwhile, in the case of transmitting the second frame FRM2, at Step S116, the MCU 10 stores the value of the header, for example, in an area of the second header HD2 allocated in the second transmission buffer unit 168. Note that for example, in the case of using an HTMC frame as the second frame FRM2, the value of the header is set each time a frame is transmitted, depending on multiple values of TOM and the value of the checksum of the TOM (Type of Message). Therefore, the value of the header may be set to a different value each time a frame is transmitted. Also, as described above, the value set in the first header HD1 of the first frame FRM1 differs from any value that can be set in the second header HD2. Accordingly, the likelihood of erroneous detection of mutually mistaking the first frame FRM1 and the second frame FRM2 can be reduced. Next, at Step S118, the MCU 10 calculates the checksum of the header stored in the second header HD2 at Step S116. Next, at Step S120, the MCU 10 stores the checksum calculated at Step S118 in the area of the second header HD2 allocated in the second transmission buffer unit 168.

Next, at Step S122, the MCU 10 stores the message (monitoring control data) in an area of the second payload part PL2 allocated in the second transmission buffer 168. Next, at Step S124, the MCU 10 calculates the checksum of the message stored in the second transmission buffer 168 at Step S122. Next, at Step S126, the MCU 10 stores the checksum calculated at Step S124 in the area of the second payload part PL2 allocated in the second transmission buffer 168. Thus, data of the second frame FRM2 is generated in the second transmission buffer 168.

Next, at Step S128, the MCU 10 generates a bit stream from the data (byte stream) included in the second frame FRM2 generated in the second transmission buffer 168, encodes the bit stream into Manchester codes, and outputs the encoded bit stream to the bias supplier 30. Conversion from a byte stream to a bit stream is executed in substantially the same way as in the first frame FRM1. In substantially the same way as in the transmission process of the first frame FRM1 described with Step S114, the optical transceiver 100 outputs an optical transmission signal having a low-rate-modulation signal superimposed that includes information on the second frame FRM2, to the optical transceiver 101 at the receiving end. Thus, the transmitting operations of the second frame FRM2 for the first time end. Note that in the case of transmitting multiple second frames FRM2 consecutively, Step S116 to S128 are executed repeatedly.

<Receiving Operations of Frames Including Monitoring Control Data>

Figure 5:
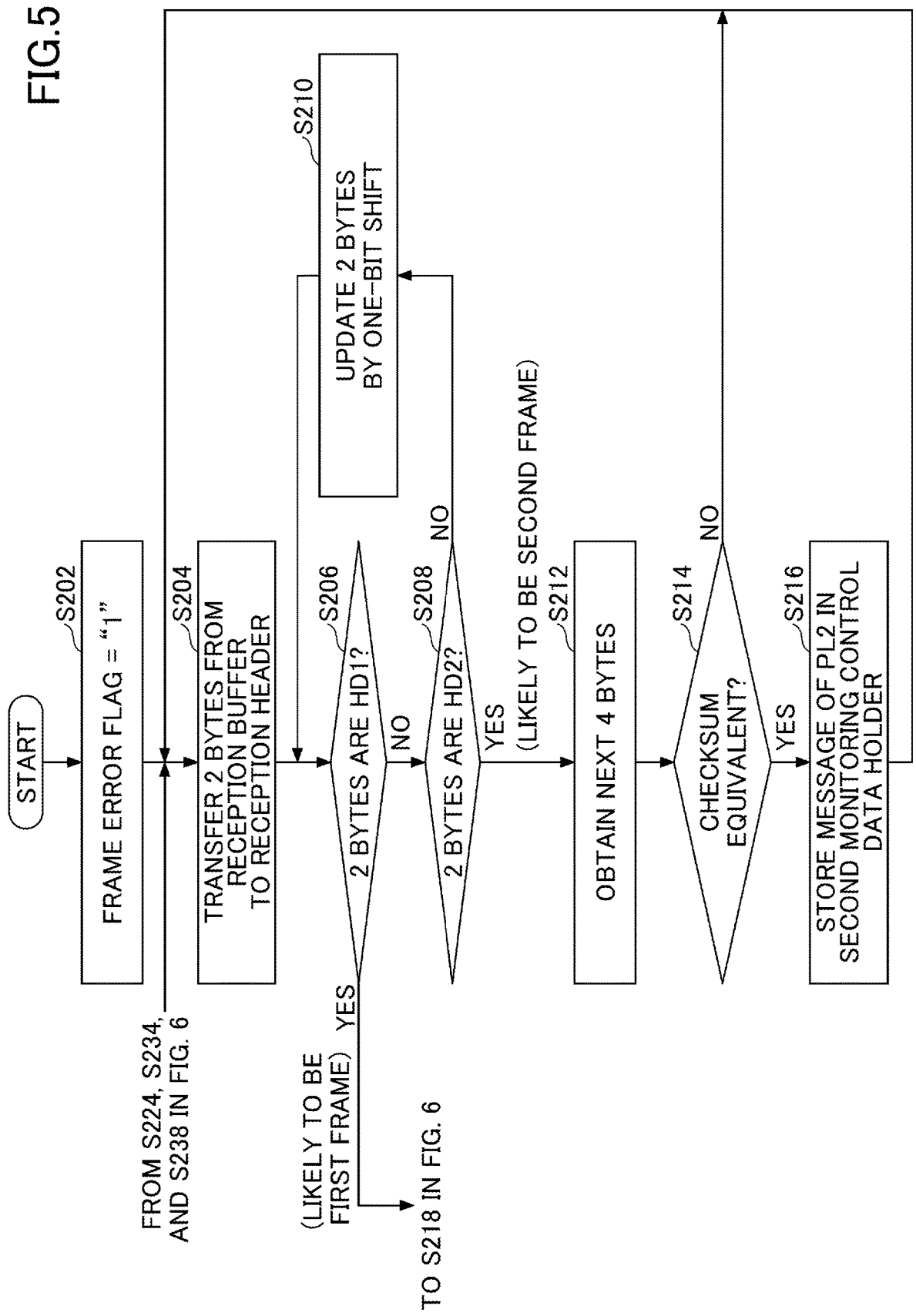
FIG. 5 is a flow chart illustrating an example of receiving operations of a first frame or a second frame executed by the optical transceiver in FIG. 1.
Figure 6:
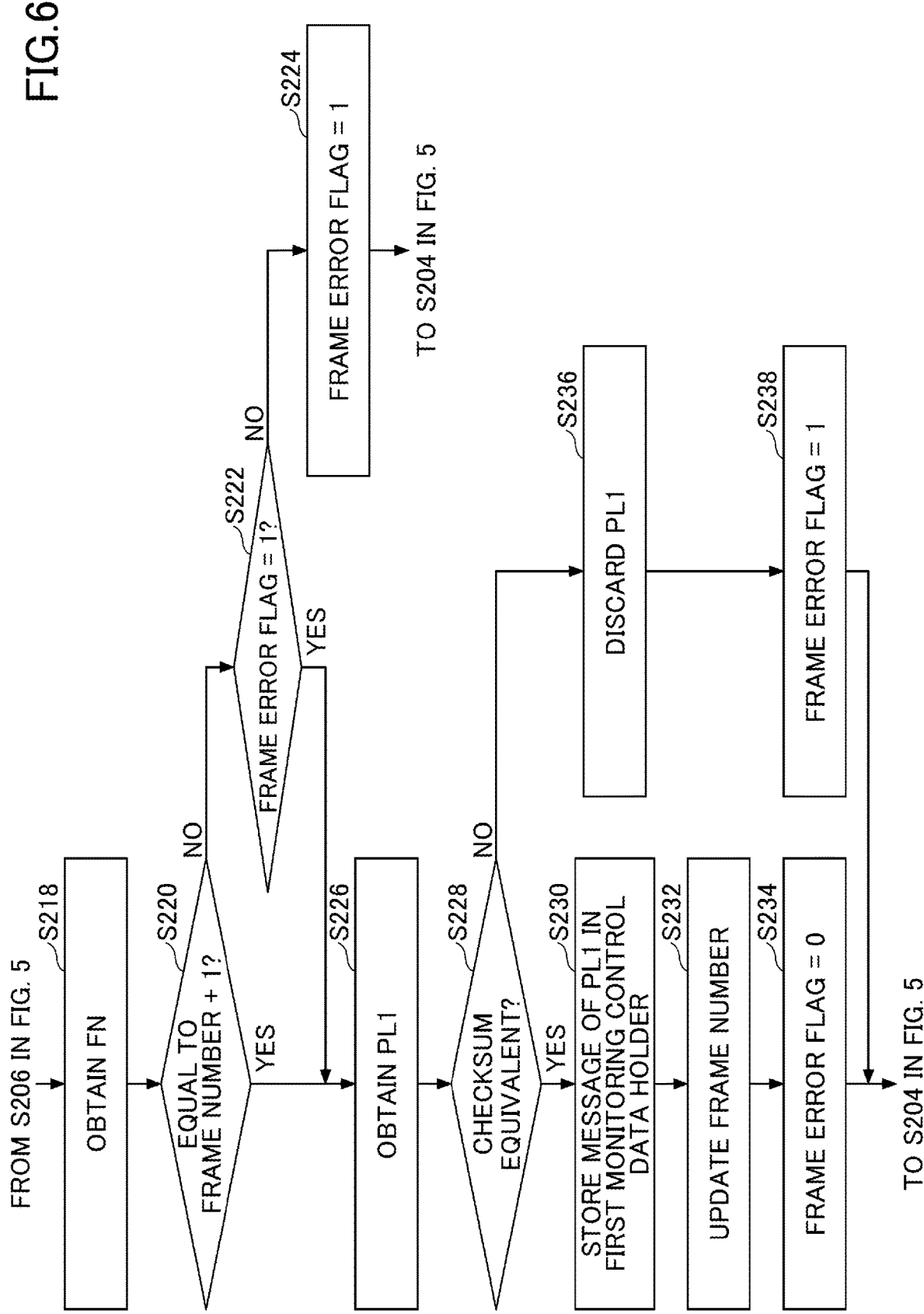
FIG. 6 is a flow chart illustrating continuation of the receiving operations in FIG. 5.

FIGS. 5 and 6 is a flow chart illustrating an example of receiving operations of the first frame FRM1 and the second frame FRM2 executed by the optical transceiver 100 in FIG. 1. The flow illustrated in FIGS. 5 and 6 illustrates a method of reproducing monitoring control data by detecting the header of the first frame FRM1 or the second frame FRM2 for a bit stream decoded from a low-rate modulation signal 4, based the respective frame structures. For example, as in FIG. 4, the operations illustrated in FIGS. 5 and 6 are implemented by the MCU 10 executing a control program (reception program) stored in the built-in ROM. In other words, FIGS. 5 and 6 illustrates an example of a control method (frame synchronization method) of the optical transceiver 100 and an example of a control program of the optical transceiver 100. Note that the operations illustrated in FIGS. 5 and 6 may be implemented by a logic circuit programmed in the programmable logic unit provided in the MCU 10. Alternatively, the operations illustrated in FIGS. 5 and 6 may be executed by a logic device such as a CPLD or FPGA instead of the MCU.

The operations illustrated in FIGS. 5 and 6 start in the case where the power supply of the optical transceiver 100 is turned on to start receiving operations of an optical signal. For example, in the case where the optical transceiver 100 is a pluggable optical transceiver, once the optical transceiver 100 is attached to the cage of the optical transmission device, the optical transmission device supplies power to the optical transceiver 100 to turn on the power supply of the optical transceiver 100. Alternatively, the operations start in the case where the optical transceiver 100 is reset by the optical transmission device, and then, receiving operations of an optical signal are started. More specifically, the operations illustrated in FIGS. 5 and 6 start when the optical transceiver 100 at the transmitting end receives monitoring control data from the optical transceiver 101 at the receiving end. Note that data (bit stream) of the first frame FRM1 and the second frame FRM2 received from the optical transceiver 101 at the receiving end is held sequentially in the reception buffer 161 allocated in the RAM 16, before frame synchronization is executed with the frame of either the first frame FRM1 or the second frame FRM2. The following description is the same as in the case where the optical transceiver 101 at the receiving end receives monitoring control data from the optical transceiver 100 at the transmitting end.

First, at Step S202, the MCU 10 sets the value of the frame error flag of the frame error flag holder 164 to "1" as the initial value. Next, at Step S204, the MCU 10 decodes Manchester codes extracted by the low-pass filter 40, to generate a bit stream. The MCU 10 converts the generated bit stream to one-byte data items starting from the first bit by units of eight bits, and stores the generated one-byte data items in the reception buffer 161 starting from the head in the order of generation. Accordingly, the byte stream is generated in the reception buffer 161. Among the byte stream held in the reception buffer 161, two bytes that have not been obtained in the reception header 162, and are earlier in the order of reception, are transferred to the reception header 162. In other words, the MCU 10 generates a first byte stream (two bytes) having the same length as the length of the first header HD1 and the second header HD2 from the byte stream held in the reception buffer 161.

The first header HD1 and the second header HD2 are set to have the same size; therefore, the MCU 10 can start a detection process of the first frame FRM1 and the second frame FRM2 by transferring the two bytes from the reception buffer 161 to the reception header 162. In other words, part of the detection process of the header of the frame can be shared, and hence, the process of frame synchronization can be simplified.

Next, at Step S206, the MCU 10 extracts the two-byte data held in the reception header 162, to generate the first byte stream (first data). In other words, the reception header 162 holds the first byte stream (first data). The MCU 10 determines whether the generated value of the first byte stream is equal to the unique value (fixed data) set in the first header HD1 header of the first frame FRM1. This corresponds to, for example, the MCU 10 determining equivalence with the synchronization pattern (e.g., 1111011000101000b described above) of the header in the bit stream decoded from the Manchester codes. If the value of the first byte stream is equal to the value of the header of the first header HD1, there is a likelihood that the received frame is the first frame FRM1, and hence, the MCU 10 causes the process to transition to Step S218 in FIG. 6. If the value of the first byte stream is not equal to the value of the header of the first header HD1, the MCU 10 determines that the received frame is not the first frame FRM1, and hence, causes the process to transition to Step S208.

If the MCU 10 determines at Step S206 that there is a likelihood that the first byte stream is the first header HD1, before a detection process of the second header HD2, the MCU 10 executes processing at Steps S218 and thereafter in FIG. 6 that does not include the detection process of the second header HD2. Therefore, also in the case where the bit stream of the data stored in the first payload part PL1 of the first frame FRM1 includes the same bit stream as the bit stream of the second header HD2 (synchronization pattern of the second frame FRM2), the MCU 10 can reduce erroneous detection of the second header HD2.

At Step S208, the MCU 10 extracts the two-byte data held in the reception header 162, to generate a second byte stream. At this time, the MCU 10 may substitute the first byte stream described above for the second byte stream. In that case, the value of the second byte stream is equal to the value of the first byte stream. The MCU 10 determines whether the value of the second byte stream is equal to the second header HD2 of the second frame FRM2 by taking the checksum into account. More specifically, in the case where the value of the header of the second header HD2 may take multiple values different from each other as in the HTMC frame, the MCU 10 determines whether the value of the header of the second header HD2 is equal to one of the multiple values different from each other. In the case where the value of the second byte stream is equal to the value of the header of the second header HD2, and the checksum included in the value of the header is correct, there is a likelihood that the received frame is the second frame FRM2, the MCU 10 causes the process to transition to Step S212. This corresponds to, for example, determining equivalence with the synchronization pattern of the header (e.g., in the case of the HTMC frame, a 16-bit pattern constituted with 11 bits of TOM and a checksum of five bits of TOM) in the bit stream decoded from the Manchester code described above. If the value of the second byte stream is not equal to the value of the header of the second header HD2, or if the checksum included in the header value is not correct, in order to continue detection of the header of the first frame FRM1 or the second frame FRM2, the MCU 10 causes the process to transition to Step S210.

If the MCU 10 determines at Step S208 that there is a likelihood that the second byte stream is the second header HD2, the MCU 10 executes processing at Steps S212 and thereafter that does not include a detection process of the first header HD1. Therefore, also in the case where the bit stream of the data stored in the second payload part PL2 of the second frame FRM2 includes the same bit stream as the bit stream of the first header HD1 (synchronization pattern of the first frame FRM1), the MCU 10 can reduce erroneous detection of the first header HD1.

At Step S210, the MCU 10 generates new two-byte data from the data held in the reception buffer 161 by shifting by one bit backward (toward the bit received later) the position of the first bit of the two-byte data previously transferred to the reception header 162; transfers the newly generated two bytes to the reception header 162; and causes the process to return to Step S206. Accordingly, the first byte stream is updated to a value that is obtained by shifting the previous value by one bit. Note that when shifting the position of the first bit by one bit backward, as the bit at the end (LSB) of the new two-byte data, the first bit (MSB) of one-byte data next to the two bytes previously transferred is used. For example, if the two-byte data transferred to the reception header 162 is 0111101100010100b (7B14h) and the next one-byte data is 00000000b (00h), the new two-byte data is 1111011000101000b (F628h). Alternatively, the new two-byte data is generated by adding the next one byte to the previously transferred two-byte data; shifting the data so as to shift by one bit backward the position of the first bit; and converting the shifted data to one-byte data items starting from the new first bit by units of eight bits. In other words, in the reception header 162, the MCU 10 shifts the stored two-byte data by one bit leftward to push out the oldest one bit (MSB of the first byte data) from the reception header 162, and appends one bit at the end (LSB of the second byte data), to the first bit (MSB) of one-byte data that has not yet been obtained in the reception buffer 161, and is earlier in the order of reception. Note that this shift operation may be executed, for example, by transferring the two-byte data stored in the reception header 162 to a register provided in the MCU 10 and next one byte of data stored in the reception buffer 161, and storing two-byte data as a result of the shift operation in the reception header 162. Then, the MCU 10 executes processing at Step S206, by using the updated two-byte data (first data) including a new one bit appended to the reception header 162.

Steps S206, S208, and S210 correspond to an operation of searching for a synchronization pattern, in which, for example, the bit stream received and decoded from the Manchester codes is stored in a register of the MCU 10, a one-bit shift operation (shift leftward) is executed to push out the first bit (MSB) of the first byte, and then, whether the data of the first two bytes (i.e., 16-bit data) of the shift register is equal to the synchronization pattern (fixed data) of the frame, is determined. Note that when the position of the first bit of the two-byte data is shifted by one bit backward at Step S210 (alternatively, when the 16-bit data is shifted leftward by the shift operation), the value of the byte stream after shifting the position of the first bit becomes different from the value of the byte stream before shifting the first bit. Therefore, the data held in the reception buffer 161 is updated according to the new position of the first bit of the bit stream, or updated by the shift operation or the like in the register when the data is extracted as the message, and then, stored in the monitoring control data holder.

In this way, in the case where the two-byte data held in the reception header 162 is neither the data of the first header HD1 nor the data of the second header HD2, the MCU 10 shifts by one bit backward (toward the bit received later) the position of the first bit of the bit stream obtained by decoding the Manchester codes, to execute a process of generating the byte stream based on the new first bit. At this time, as described above, the MCU 10 may transfer the byte stream held in the reception buffer 161 to the register of the MCU 10, and return the byte stream generated by the shift operation (shift by one bit leftward) to the reception buffer 161. Accordingly, the MCU 10 can securely detect the first header HD1 or the second header HD2 from the byte stream held in the reception header 162. Then, the MCU 10 can obtain the first frame FRM1 based at least in part on detection of the first header HD1, and can obtain the second frame FRM2 based at least in part on detection of the second header HD2. In other words, the optical transceiver 100 can execute frame synchronization with the first frame FRM1 and the second frame FRM2 transmitted by low-rate modulation signals.

At Step S212, among the data held in the reception buffer 161, the MCU 10 obtains four-byte data that has not been obtained and is earlier in the order of reception, as the message and the checksum of the second payload part PL2 of the second frame FRM2. In other words, the MCU 10 obtains a byte stream subsequent to the second byte stream. Note that here, it is assumed that the data held in the reception buffer 161 holds a value converted to one-byte data items from the head of the bit stream by units of eight bits, that is obtained when the value of the reception header 162 is equal to the value of the second header HD2 (synchronization pattern), and the process has reached Step S212. Next, at Step S214, the MCU 10 calculates the checksum of the obtained message, to determine whether the calculated checksum is equal to the checksum obtained from the reception buffer 161. For example, in the case of the second frame FRM2 being an HTMC frame, the first three bytes among the four bytes of the second payload part correspond to a message; therefore, the MCU 10 calculates the checksum of the first three bytes, and compares the calculated checksum with the value of the checksum in the fourth byte.

If the checksums are equal to each other, the second frame FRM2 is detected (frame synchronization), and hence, the MCU 10 causes the process to transition to Step S216. If the checksums are not equal to each other, either the first frame FRM1 or the second frame FRM2 cannot be detected; therefore, in order to obtain the next two bytes from the reception buffer 161 to continue searching for a synchronization pattern, the MCU 10 causes the process to return to Step S204.

At Step S216, the MCU 10 extracts the message stored in the second payload part PL2 of the second frame FRM2, and stores the message in the second monitoring control data holder 166. Accordingly, frame synchronization completes for a single second frame FRM2, based on the frame structure. For example, the message (monitoring control data) stored in the second monitoring control data holder 166 is then transmitted by the MCU 10 to the optical transmission device through the I²C bus. Alternatively, the message is stored in the area provided in the RAM 16 for monitoring control. Note that the second monitoring control data holder 166 is overwritten by a message extracted from a newly received second frame FRM2. Thereafter, the MCU 10 causes the process to return to Step S204 in order to receive the next first frame FRM1 or the second frame FRM2.

At Step 218 in FIG. 6, the MCU 10 obtains one byte among data held in the reception buffer 161 that has not yet obtained and is earlier in the order of reception, as the frame number part FN of the first frame FRM1, and transitions to processing at Step S220. In other words, the MCU 10 obtains a one-byte byte stream subsequent to the first byte stream. Note that here, it is assumed that the data held in the reception buffer 161 holds a value converted to one-byte data items from the head of the bit stream by units of eight bits, that is obtained when the value of the reception header 162 is equal to the value of the first header HD1 (synchronization pattern), and the process has reached Step S212. In the case of receiving data in the first frame FRM1 correctly, for example, the one-byte data obtained at Step S218 is expected to be, for example, a value obtained by adding "1" to the value of the frame number held in the frame number holder 165.

Therefore, at Step S220, the MCU 10 determines whether the one-byte data obtained at Step S218 is equal to the value obtained by adding "1" to the value of the frame number held in the frame number holder 165, i.e., the expected value. If the one-byte data obtained at Step S218 is equal to the expected value, the MCU 10 executes Step S226, or if the one-byte data is not equal to the expected value, executes Step S222.

At Step S222, the MCU 10 determines whether the frame error flag held in the frame error flag holder 164 is "1". The frame error flag being "1" indicates that the receiving operation of the previous monitoring control data has failed, or that there has been no previous receiving operation (i.e., the first receiving operation). The frame error flag being "0" indicates that the previous receiving operation of the monitoring control data has succeeded.

In the case where the frame error flag is "1", the MCU 10 causes the process to transition to Step S226, or in the case where the frame error flag is not "1", causes the process to transition to Step S224. At Step S224, the MCU 10 determines that the receiving operation of the monitoring control data has failed due to the difference detected at Step S220 between the one-byte data obtained at Step S218 and the expected value, and sets "1" to the frame error flag holder. Then, in order to continue searching for a synchronization pattern by obtaining the next two bytes, the MCU 10 causes the process to transition to Step S204 in FIG. 5. In this way, in the case where the frame number subsequent to the frame number received in the previous time cannot be detected, the MCU 10 can determine that the correct first frame FRM1 was not received, to quickly start the next receiving operation, and thereby, can increase the detection frequency of monitoring control data.

At Step S226, among the data held in the reception buffer 161, the MCU 10 obtains 253 bytes that has not been obtained and are earlier in the order of reception, as the message and the checksum of the first payload part PL1 of the first frame FRM1. Note that as described above, the checksum may be held as the checksum part. Next, at Step S228, the MCU 10 calculates the checksum of the frame number obtained at Step S218 and the message of the obtained first payload part PL1 obtained at Step S226. Then, the MCU 10 determines whether the calculated value of the checksum is equal to the value of the checksum obtained from the reception buffer 161. Note that as the checksum, a value calculated for the message of the first payload part PL1 excluding the frame number may be used.

If the checksums are equal to each other, the first frame FRM1 is detected (frame synchronization), the MCU 10 causes the process to transition to Step S230. If the checksums are not equal, the correct first frame FRM1 is not received, the MCU 10 causes the process to transition to Step S236. In other words, the MCU 10 determines whether to store the message of the obtained first payload part PL1 in the first monitoring control data holder 163 in the RAM 16, depending on the checksums being equal or being different determined at Step S228. In this way, for the first frame FRM1, frame synchronization is executed when the value of first header HD1, the value of the frame number, and the value of the checksum are equal to the respective predetermined values. In this way, by using the checksum to determine whether the data of the obtained first payload part PL1 is monitoring control data, the accuracy of detection of the monitoring control data can be improved, and the probability of erroneous detection of monitoring control data can be reduced.

At Step S230, the MCU 10 extracts the message stored in the first payload part PL1 of the first frame FRM1, and stores the extracted message in the first monitoring control data holder 163. Accordingly, frame synchronization completes for a single first frame FRM1, based on the frame structure. The message (monitoring control data) stored in the first monitoring control data holder 163 is then transmitted by the MCU 10 to the optical transmission device through the I²C bus. Alternatively, the message is stored in the area provided in the RAM 16 for monitoring control. Note that the first monitoring control data holder 163 is overwritten by a message extracted from a newly received first frame FRM1.

Next, at Step S232, the MCU 10 extracts the frame number stored in the frame number part FN of the first frame FRM1, and stores the frame number in the frame number holder 165, to update the frame number held in the frame number holder 165. In other words, the MCU 10 rewrites the frame number to be held in the frame number holder 165 that is a frame number to be used in the next receiving operation, to the one-byte data obtained at Step S218. Note that when rewriting the frame number holder 165, "1" is added in advance to the value of one byte obtained at Step S218 to set the added value as the expected value of the next frame number, and Step S220 may be modified to determine whether the newly obtained value of the frame number is equal to the expected value held in the frame number holder 165.

Next, at Step S234, as the receiving operation of the monitoring control data has succeeded, the MCU 10 sets the frame error flag holder 164 to "0", and in order to obtain the next two bytes to receive a next frame of either the first frame FRM1 or the second frame FRM2, causes the process to transition to Step S204 in FIG. 5.

At Step S236, the MCU 10 discards the data of the first payload part PL1 obtained at Step S226. Next, at Step S238, as the receiving operation of the monitoring control data has failed, the MCU 10 sets the frame error flag holder 164 to "1", and then, in order to obtain the next two bytes to receive a next frame of either the first frame FRM1 or the second frame FRM2, executes Step S204.

<Transmitting/Receiving Operations of Frames Including Monitoring Control Data>

Figure 7:
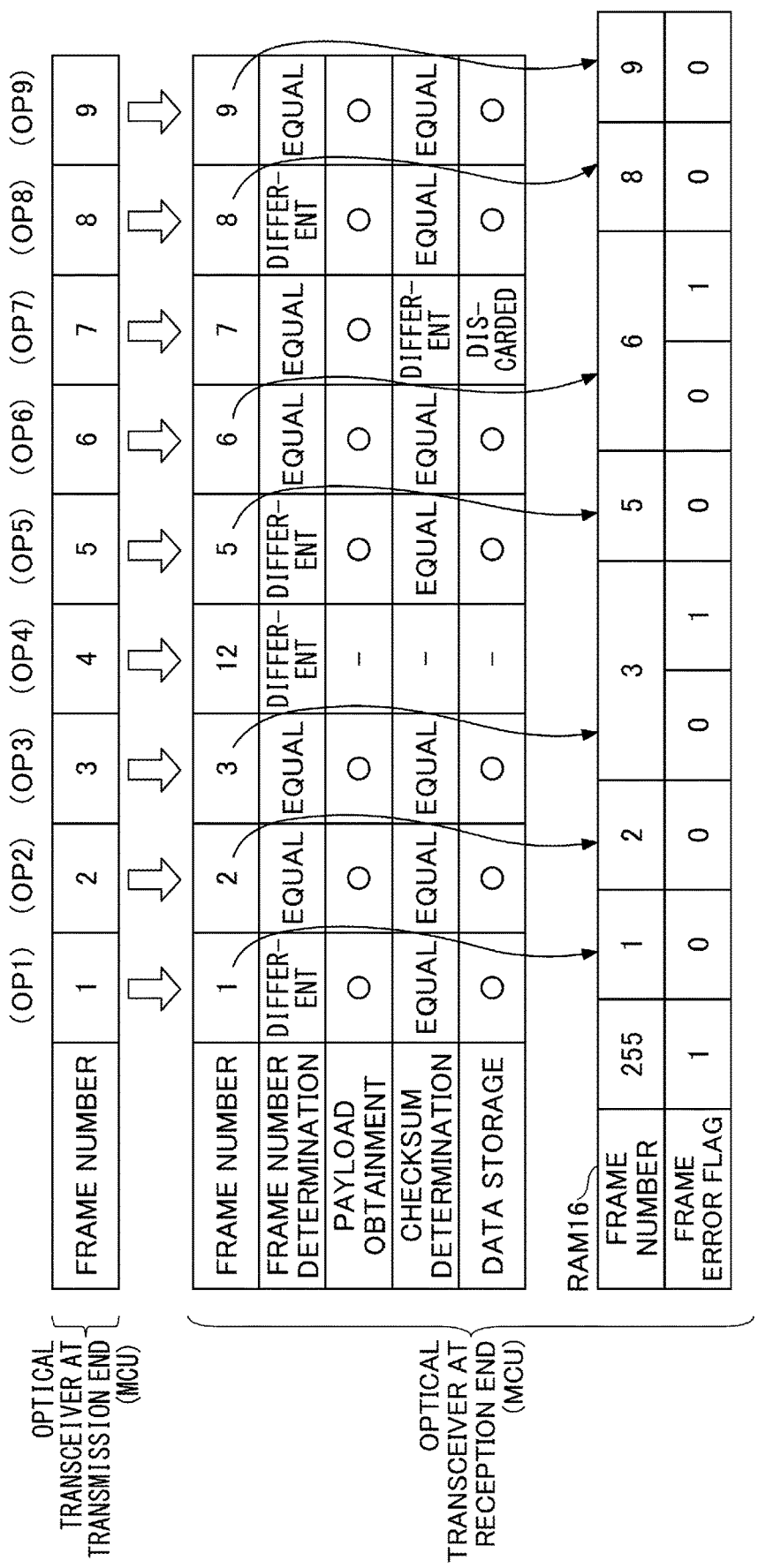
FIG. 7 is an explanatory diagram illustrating an example of transmission/receiving operations of first frames including monitoring control data between the optical transceivers in FIG. 1.

FIG. 7 is an explanatory diagram illustrating an example of transmitting/receiving operations of first frames FRM1 including monitoring control data between the optical transceivers 100 in FIG. 1. Although in practice, the optical transceiver 100 transmits and receives first frames FRM1 each including Manchester-coded monitoring control data, in order to make the description easier to understand, values before encoding into Manchester codes and values after having encoded into the Manchester codes are shown. The values illustrated in FIG. 7 are shown in decimal. For example, the operations illustrated in FIG. 7 are implemented by the MCU 10 executing a control program. Note that in FIG. 7, in order to make the description easier to understand, an example will be shown in which, without intervention of a second frame FRM2, only first frames FRM1 are transmitted and received continuously.

The MCU 10 of the optical transceiver 100 that transmits frames, while updating the value of the frame number, according to the operations described with Step S104 to Step S114 in FIG. 4, transmits first frames FRM1 each including monitoring control data sequentially to the optical transceiver 101 at the receiving end. In FIG. 7, only frame numbers transmitted by the optical transceiver 100 at the transmitting end are illustrated. The MCU 10 of the optical transceiver 101 at the receiving end executes the operations described with Steps S204, S206, and S218 to S238 in FIGS. 5 and 6, to sequentially receive the first frames FRM1 each including the monitoring control data. In other words, the MCU 10 detects (synchronizes) each first frame FRM1 for the bit stream decoded from a low-rate modulation signal 4, to generate the monitoring control data based on the frame structure of the first frame FRM1.

In FIG. 7, nine receiving operations OP (OP1-OP9) of the first frames FRM1 are illustrated. In FIG. 7, a transmitting operation of a frame executed by the optical transceiver 100 and a receiving operation of the frame executed by the optical transceiver 101 responding to the transmitting operation are described correspondingly. In the case of referring to a transmitting operation, the transmitting operation will be described with a corresponding reference numeral. Note that in the frame number holder 165 and the frame error flag holder 164 in the RAM 16 of the optical transceiver 101 at the receiving end, in the initial state, a frame number of "255" and a frame error flag of "1" are held. In the following, operations of the MCU 10 of the optical transceiver 101 will be described. Note that in the following description, it is assumed that in the reception buffer 161 illustrated in FIG. 3, a value (byte stream) converted to one-byte data items from the head of the bit stream by units of eight bits, that is obtained when the value of the reception header 162 is equal to the value of the first header HD1 (synchronization pattern).

First, in the receiving operation OP1, the MCU 10 obtains data from the reception buffer 161 until the value of the first two bytes (i.e., the reception header 162) of the received byte stream is equal to the value unique to the first header HD1 (e.g., F628h). In the case where the value of the reception header 162 is equal to the value (synchronization pattern) unique to the first header HD1 (this will be referred to as detection of a synchronization pattern, hereafter), the MCU 10 obtains the next one byte as the frame number. Note that here, it is assumed that when the position of the first bit of the bit stream is shifted by one bit backward, the byte stream held in the reception buffer 161 is updated to a value (byte stream) converted to one-byte data items starting from the new first bit by units of eight bits.

The obtained frame number (="1") is not "0" to be obtained as the frame number (=255) held in the frame number holder 165 of RAM 16 plus 1; therefore, the MCU 10 determines difference between the frame numbers. Note that as the frame number takes a value of one byte, the frame number takes 0h, for example, when adding 1h to FFh (255 as decimal), where the carry is ignored. Meanwhile, as the frame error flag is "1", according to the format of the first frame FRM1 in FIG. 2, the MCU 10 obtains from the reception buffer 161, a byte stream of 253 bytes next to the byte obtained as the frame number, as the first payload part PL1. In FIG. 7, a circle shown in a field of "payload obtainment" indicates execution of an obtaining operation of a payload.

In this way, in the first receiving operation, an incorrect value or the like may be held in the frame number holder 165 as the initial value of the frame number (update data). Also in this case, in the case of the frame error flag being "1", the MCU 10 obtains a byte stream having a predetermined length as the first payload part PL1 from the reception buffer 161.

Accordingly, it becomes possible to prevent a situation in that non-equivalence between a value of the frame number obtained from the reception buffer 161 and an expected value calculated from the frame number (update data) held in the frame number holder 165 would be repeated, and thereby, a message stored in the first payload part PL1 could not be obtained. As a result, for example, continuously failing receiving operations can be prevented that would occur due to determining failure in frame synchronization even though the correct frame number of the first frame FRM1 has been received, and thereby, the reception frequency of frame numbers can be increased.

The MCU 10 calculates the checksum from the value of the obtained frame number and the value of the 251-byte byte stream obtained as the message of the first payload part PL1, and compares the calculated checksum with the two-byte data obtained as the checksum of the first payload part PL1. When the two checksums are equal to each other, the MCU 10 stores the message (monitoring control data) of the obtained first payload part PL1 in the first monitoring control data holder 163 in the RAM 16.

In FIG. 7, a circle shown in a field of "data storage" indicates that the message of the obtained first payload part PL1 is stored in the first monitoring control data holder 163 because the checksums are equal to each other. The MCU 10 stores the received value (="1") of the frame number in the frame number holder 165, stores "0" indicating success in the receiving operation of the monitoring control data in the frame error flag holder 164, and ends the receiving operation OP1.

In the receiving operation OP2, the MCU 10 determines equivalence between the frame numbers because the frame number (="2") obtained subsequent to detection of the synchronization pattern of the first header HD1 is the same as the update value ("1"+1="2") of the value (="1") of the frame number held in the frame number holder 165. The MCU 10 obtains the byte stream having a predetermined length starting from the byte at which the frame number is obtained as the first payload part PL1 from the reception buffer 161. The MCU 10 calculates the checksum from the value of the frame number whose equivalence has been confirmed and the byte stream (data having a length of 251 bytes) obtained as the message of the first payload part PL1.

As the calculated checksum is equal to the received checksum, the MCU 10 stores the byte stream obtained as the message of the obtained first payload part PL1 in the first monitoring control data holder 163. The MCU 10 stores the received value (="2") of the frame number in the frame number holder 165, stores "0" indicating success in the receiving operation of the monitoring control data in the frame error flag holder 164, and ends the receiving operation OP2. The receiving operation OP3 is executed as in substantially the same way as the receiving operation OP2.

In the receiving operation OP4, a frame number of "4" transmitted by the optical transceiver 100 is transmitted to the optical transceiver 101 as "12", for example, due to decrease in the communication quality of the optical cable (due to influence of noise and the like) that transmits the optical signal.

As the received frame number (="12") is not the update value ("3"+1="4") of the value (="3") of the frame number held in the frame number holder 165, the MCU 10 determines non-equivalence between the frame numbers. As the frame error flag held in the frame error flag holder 164 is "0", the MCU 10 rewrites "0" held in the frame error flag holder 164 to "1" indicating failure in the receiving operation. In this case, the MCU 10 ends the receiving operation OP4 without storing the value (="12") of the obtained frame number in the frame number holder 165.

In the receiving operation OP5, the frame number held in the frame number holder 165 is not updated because the previous receiving operation OP4 has failed. Therefore, the updated value of the frame number output by the optical transceiver 100 is not equal to the value of the frame number held in the frame number holder 165.

The MCU 10 determines non-equivalence between the frame numbers because the frame number (="5") obtained subsequent to detection of the synchronization pattern of the first header HD1 is not the same as the update value ("3"+1="4") of the value (="3") of the frame number held in the frame number holder 165 in the RAM 16. However, as in the receiving operation OP1, as the frame error flag is "1", the MCU 10 determines that there is a likelihood that a frame number has been detected, and obtains a byte stream having a predetermined length starting from a byte next to the byte at which the frame number is obtained, as the first payload part PL1 from the reception buffer 161. Then, the MCU 10 calculates the checksum based on the value of the obtained frame number and the byte stream obtained as the message of the first payload part PL1.

In this example, as the checksum obtained by calculation is equal to the received checksum, the MCU 10 stores the byte stream having a length of 251 bytes obtained as the message of the first payload part PL1 in the first monitoring control data holder 163. Also, the MCU 10 stores the received frame number (="5") in the frame number holder 165, stores "0" indicating success in the receiving operation of the monitoring control data in the frame error flag holder 164, and ends the receiving operation OP5.

In this way, waste of terminating the receiving operation OP5 without obtaining the received monitoring control data even though the correct monitoring control data has been received, can be prevented. Further, repetition of non-equivalence between the frame number that is sequentially updated in the optical transceiver 100, and the expected value calculated from the frame number held in the frame number holder 165 of the optical transceiver 101, can be prevented. As a result, continuously failing receiving operations despite reception of the correct frame number can be prevented. As a result, the reception frequency of the frame numbers can be increased.

The receiving operation OP6 is executed as in substantially the same way as the receiving operation OP2. In the receiving operation OP7, the MCU 10 determines equivalence between the frame numbers because the value (="7") of the frame number obtained subsequent to detection of the synchronization pattern of the first header HD1 is the same as the update value ("6"+1="7") of the value (="6") of the frame number held in the frame number holder 165. The MCU 10 obtains a byte stream having a predetermined length starting from the byte at which the frame number is obtained as the first payload part PL1 from the reception buffer 161, and calculates the checksum based on the value of the obtained frame number and the byte stream having a length of 251 bytes obtained as the message of the first payload part PL1.

In the receiving operation OP7, as the calculated checksum is not equal to the received checksum, the MCU 10 discards (i.e., does not store in the first monitoring control data holder 163) the byte stream having a length of 251 bytes obtained as the message of the first payload part PL1. The MCU 10 does not update the frame number held in the frame number holder 165, stores "1" indicating failure in the receiving operation of monitoring control data in the frame error flag holder 164, and ends the receiving operation OP7.

In the receiving operation OP8, as the value (="8") of the frame number obtained subsequent to detection of the synchronization pattern of the first header HD1 is not the same as the update value ("6"+1="7") of the value (="6") of the frame number held in the frame number holder 165, the MCU 10 determines non-equivalence between the frame numbers. Thereafter, the receiving operation OP8 is executed in substantially the same way as the receiving operation OP1, in which "8" is stored in the frame number holder 165, and "0" indicating success in the receiving operation of the monitoring control data is stored in the frame error flag holder 164. The receiving operation OP9 is executed as in substantially the same way as the receiving operation OP2.

Note that in the example illustrated in FIG. 7, the MCU 10 stores the frame number obtained subsequent to detection of the synchronization pattern of the first header HD1 in the frame number holder 165, and compares, in the next receiving operation, the frame number obtained subsequent to detection of the synchronization pattern of the first header HD1 with a value obtained by incrementing by "1" the value of the frame number held in the frame number holder 165. However, the MCU 10 may store in advance a value obtained by incrementing by "1" the value of the frame number obtained by the receiving operation in the frame number holder 165, as the expected value. In this case, the MCU 10 compares the value of the frame number obtained by the next receiving operation, with the value of the frame number held in the frame number holder 165. By comparing the value of the frame number obtained by the receiving operation with the value of the frame number held in the frame number holder 165, the MCU 10 determines whether the two values satisfy a relationship based on a rule for updating the frame number.

As described above, in the present embodiment, the optical transceiver 100 transmits and receives an optical signal having a low-rate-modulation signal superimposed including a first frame FRM1 and a second frame FRM2 having formats (frame structures) different from each other. The MCU 10 sequentially detects whether a synchronization pattern of the first header HD1 or the second header HD2 is included in a bit stream generated from the low-rate modulation signal superimposed on an optical signal transmitted and received. Accordingly, the optical transceiver 100 can reduce erroneous detection of the first frame FRM1 and the second frame FRM2, and can reduce erroneous operations of the optical transceiver 100. As a result, the reliability of the optical transceiver 100 can be improved, and the reliability of a communication system having the optical transceiver 100 installed can be improved.

In the receiving operation of monitoring control data based on frame synchronization, in the case where the value of two bytes held in the reception header 162 is not the value of unique data of either the first header HD1 or the second header HD2, the MCU 10 executes a process of shifting by one bit backward the start position of generation (first bit) of a byte stream in the bit stream generated from the low-rate modulation signal. Accordingly, the MCU 10 can reliably detect the first header HD1 or the second header HD2 from the value held in the reception header 162. Then, the MCU 10 can securely obtain the first frame FRM1 based at least in part on detection of the first header HD1, and can securely obtain the second frame FRM2 based at least in part on detection of the second header HD2.

The first header HD1 and the second header HD2 are set to have the same length (size) as each other. Therefore, the MCU 10 can start a detection process of the first frame FRM1 and the second frame FRM2, by transferring the first two bytes that are generated from the first bit of the bit stream, from the reception buffer 161 to the reception header 162. In other words, compared to the case of detecting frames having lengths of the header different from each other, part of the detection process of the frame can be shared, and the detection process of the frame can be simplified.

The MCU 10 can use the first frame FRM1 or the second frame FRM2 selectively, depending on the type or data volume of monitoring control data to be transmitted to the optical transceiver 100 as the communication counterpart. For example, the MCU 10 uses the first frame FRM1 in the case where the data size of the monitoring control data is large, and uses the second frame FRM2 in the case where the data size of the monitoring control data is small. Accordingly, the MCU 10 can minimize the size of the bit stream including the monitoring control data to be superimposed on an optical transmission signal. Also, the MCU 10 may use the first frame FRM1 or the second frame FRM2 properly depending on difference in the configuration and the use of monitoring control data. Accordingly, the optical transceiver 100 can execute advanced monitoring control with higher functionality, in which monitoring control schemes different from each other are combined.

As described above, the embodiments of the present disclosure have been described; note that the present disclosure is not limited to the embodiments described above. Various changes, modifications, substitutions, additions, deletions, and combinations of these are possible within the scope described in the claims. These are naturally included in the technical scope of the present disclosure.

What is claimed is:

1. An optical transceiver comprising:
an optical transmitter part configured to transmit an optical transmission signal;
an optical receiver part including a light receiving element and a low-pass filter, the light receiving element being configured to receive an optical reception signal having a monitoring control signal superimposed and generate an electrical signal in accordance with the optical reception signal, the low-pass filter being configured to extract the monitoring control signal from the electrical signal, the monitoring control signal including a first frame and a second frame, the first frame having a first header at a head of the first frame, the first header having a first binary value for identifying the first header, the second frame having a second header at a head of the second frame, the second header having a second binary value for identifying the second header, the second binary value being different from the first binary value, the first frame and the second frame being separated from each other in time; and
a processing part including a memory and a processor configured to:
generate a bit stream from the monitoring control signal,
generate a first byte stream from the bit stream, the first byte stream having a length equal to a length of the first header,
generate a first following byte stream subsequent to the first byte stream from the bit stream,
extract monitoring control data from the first following byte stream based on a frame structure of the first frame, when the first byte stream has a binary value identical a first binary value of the first header,
generate a second byte stream from the bit stream when the first byte stream has a binary value different from the first binary value of the first header, the second byte stream having a length equal to a length of the second header,
generate a second following byte stream subsequent to the second byte stream from the bit stream, and
extract the monitoring control data from the second following byte stream based on a frame structure of the second frame, when the second byte stream has a binary value equal to a second binary value of the second header.

2. The optical transceiver according to claim 1, wherein the processor is further configured to update the first byte stream by shifting by one bit the bit stream, when the second byte stream has a binary value different from the second binary value of the second header.

3. The optical transceiver according to claim 1, wherein the second header has a length equal to a length of the first header, and wherein the processor is further configured to substitute the first byte stream for the second byte stream, when the first byte stream has a binary value different from the first binary value of the first header.

4. The optical transceiver according to claim 1, wherein the frame structure of the first frame includes the first header, a frame number part, and a first payload part, and the frame structure of the second frame includes the second header and a second payload part.

5. A frame synchronization method executed by an optical transceiver including a memory and a processor, the method comprising:

receiving an optical reception signal having a monitoring control signal superimposed, and extracting the monitoring control signal from the optical reception signal, the monitoring control signal including a first frame and a second frame, the first frame having a first header leading the first frame, the first header having a first binary value for identifying the first header, the second frame having a second header leading the second frame, the second header having a second binary value for identifying the second header, the second binary value being different from the first binary value, the first frame and the second frame being separated from each other in time;

generating a bit stream from the monitoring control signal;

generating a first byte stream from the bit stream, the first byte stream having a length equal to a length of the first header;

generating a first following byte stream subsequent to the first byte stream from the bit stream, extracting monitoring control data from the first following byte stream based on a frame structure of the first frame, when the first byte stream has a binary value identical to the first binary value of the first header;

generating a second byte stream from the bit stream, when the first byte stream has a binary value different from the first binary value of the first header, the second byte stream having a length equal to a length of the second header;

generating a second following byte stream subsequent to the second byte stream (second data) from the bit stream, and extracting the monitoring control data from the second following byte stream based on a frame structure of the second frame, when the second byte stream has a binary value identical to the second binary value of the second header.

6. The frame synchronization method according to claim 5, the method further comprising:

updating the first byte stream by shifting by one bit the bit stream, when the second byte stream has a binary value different from the second binary value of the second header.

7. The frame synchronization method according to claim 5, wherein the second header has a length equal to a length of the first header, the method further comprising:

substituting the first byte stream for the second byte stream, when the first byte stream has a binary a value different from the first binary value of the first header.

8. The frame synchronization method according to claim 5, wherein the frame structure of the first frame includes the first header, a frame number part, and a first payload part, and the frame structure of the second frame includes the second header and a second payload part.

* * * * *